UNITED STATES PATENT OFFICE.

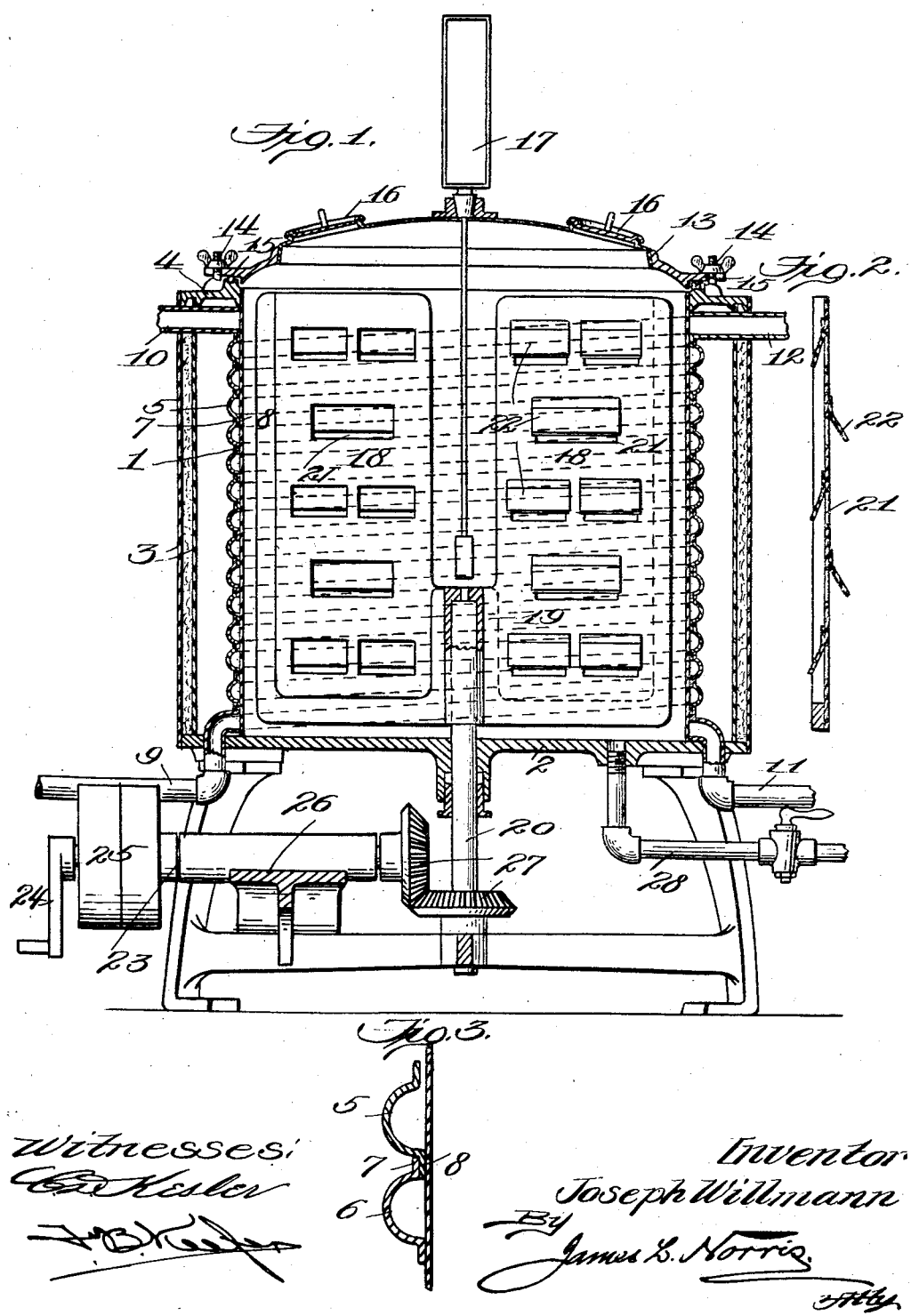

JOSEPH WILLMANN, OF DERBY, CONNECTICUT.

APPARATUS FOR MANUFACTURING ARTIFICIALLY-SOURED MILK.

969,018.     Specification of Letters Patent.     Patented Aug. 30, 1910.

Application filed July 17, 1909. Serial No. 508,156.

*To all whom it may concern:*

Be it known that I, JOSEPH WILLMANN, a subject of the Emperor of Germany, residing at Derby, in the county of New Haven and State of Connecticut, have invented certain new and useful Improvements in Apparatus for Manufacturing Artificially-Soured Milk, of which the following is a specification.

My present invention relates to improvements in the manufacture of artificially soured milk, and it has for its object primarily to provide a simple and efficient apparatus whereby the milk or culture medium may be pasteurized and cooled to the incubation temperature, the cultures may be readily introduced while the culture medium is held at a favorable temperature, and after the desired degree of activity has been reached, the temperature of the product may be quickly reduced, preparatory to the discharge of the product into bottles or other shipping or storing receptacles, the apparatus being provided with means for effectively agitating and thoroughly mixing the liquid or substance therein, thus insuring a uniform product and, moreover, the apparatus is provided with means for receiving the heating and cooling mediums in such a manner as to effect the heating and cooling of the liquid or substance under treatment quickly and with facility.

To these and other ends, the invention consists in certain improvements, and combinations and arrangements of parts, all as will be hereinafter more fully described, the novel features being pointed out particularly in the claims at the end of the specification.

In the accompanying drawing:—Figure 1 represents a central vertical section of an apparatus of this character constructed in accordance with the present invention; Fig. 2 is a detail sectional view of the agitator; Fig. 3 is a detail sectional view showing the manner in which the coils for the temperature-changing mediums are applied to the chamber containing the liquid or substance under treatment.

Similar parts are designated by the same reference characters in the several views.

In the accompanying drawing, I have shown certain embodiments of the invention as examples. It will be understood, however, that certain modifications and changes may be made in the construction of the apparatus and in the relative arrangement of the parts whereby the invention may be applied to the best advantage according to the circumstances of each particular case.

In that form of the invention shown, the apparatus comprises a chamber or receptacle having a wall 1 which is preferably cylindrical or annular the bottom of which is closed by a base plate 2 supported on legs or otherwise, and this chamber is preferably insulated from the atmosphere in a suitable manner, double walls 3 being shown in the present instance as surrounding the chamber but leaving an annular space at the exterior of the chamber, and the space between the double walls may be filled with asbestos or other suitable heat insulating material. These double walls may also be supported on the base plate 2, and a ring 4 is fitted tightly to the top edges of the double walls and to the upper edge of the wall 1 of the central chamber, this ring serving to retain the several walls in properly centered relation and closing the annular spaces formed between them. The wall 1 of the central chamber is preferably composed of material that will conduct heat readily and which will not be affected by the action of the substance under treatment, German silver or copper tinned being suitable for the purposes. The substance under treatment is preferably heated or pasteurized in the central chamber and then cooled and, to facilitate these operations, one or more coils preferably encircle the wall 1 of this chamber. In that form of the invention shown in Figs. 1 to 3 inclusive, a double coil is shown consisting of two tubes 5 and 6 which are coiled helically and are arranged in alternate relation, the alternate disposition of the coils insuring uniform exposure of the wall 1 either to the heating or the cooling medium. In order to obtain a relatively high efficiency in the heating and cooling operations, each tube is in the form approximately of a semicircle, that is to say, it is segmental and its edges are out-turned to form securing flanges which may be readily soldered or otherwise properly secured to the exterior surface of the wall 1 of the central chamber. It is preferable to overlap the lateral flange 7 of one tube with the adjacent flange 8 of the next tube, the overlapping of the flanges enabling a maximum number of convolutions to be applied to the exterior of the chamber. One of the tubes is provided with an inlet 9 for steam or other heating medium, an outlet 10 for the discharge of the steam or heating medium, the other tube having an inlet 11 for a cooling liquid such as brine, and an outlet 12 through which the cooling liquid is discharged, suitable valves being provided for controlling the introduction and discharge of the heating and cooling liquids with reference to the respective tubes or coils. In those cases where a single coil is used, suitable branch connections may be attached to the extremities of the coil and equipped with appropriate controlling valves for the heating and cooling mediums whereby the circulation of these mediums through the single coil may be controlled. The top of the central chamber may be tightly closed by a cover 13 which may be detachably secured in position by means of clamping bolts 14 and a gasket 15 which may be interposed between the cover and the ring 4. Relatively smaller openings may be provided in the main cover through which the cultures may be introduced, suitable lids 16 being provided for such openings. A thermometer 17 is also shown as extending through the cover and having a bulb arranged in approximately the center of the chamber in which the substance is treated.

In order to suitably agitate the substance during its treatment so as to prevent either under-exposure or over-exposure either to the heating or cooling medium and, moreover, to insure thorough mixture of the liquid whereby a uniform product may be obtained, I provide an agitator which consists in the present instance of a revoluble member having relatively flat blades or plates 18 which are connected toward their lower ends by a hub 19, the latter being splined to a vertical shaft 20 which passes upwardly through the base plate 2 and serves to impart the necessary motion to the agitator, a stuffing-box being provided to prevent leakage of the liquid through the base plate. Each blade or plate is provided with a number of suitably located openings 21, they being preferably arranged in staggered relation on each plate, and a series of vanes or deflectors 22 are provided one for each opening, these vanes being secured to the plate above the top edge of each opening and are inclined downwardly at a suitable angle so as to deflect the liquid flowing through these openings. The vanes are preferably applied alternately to the opposite sides of the blade or plate whereby a turning movement of the agitator will cause the liquid to flow downwardly through certain openings and upwardly through the remaining openings, the result being that a thorough mixing action of the liquid is produced. In practice, it is preferable to provide for a combined movement of the agitator, that is to say, during one part of the operation it may be preferable to oscillate or reciprocate the agitator while during another part of the operation it may be desirable or necessary to revolve it. For this purpose, I have shown in the present instance one form of driving means which is capable of producing this result, it consisting in the instance shown of a shaft 23 having a crank 24 and also one or more pulleys 25 thereon, the crank being adapted to receive a reciprocating link whereby the agitator may be rocked to and fro, while to the pulley or pulleys 25 is applied a belt or other power transmitting device whereby a continuously rotating or revolving motion may be imparted to the agitator. The shaft 23 in the present instance is journaled in a bearing 26 suitably formed or arranged at the base of the apparatus, and bevel gearing 27 serves to operatively connect the shaft 23 to the agitator shaft 20.

28 represents a pipe through which the finished product may be withdrawn, a suitable valve being provided which is normally closed during the operation of the apparatus.

The apparatus may be operated as follows: In the manufacture of artificially soured milk, first the culture medium, milk as a general rule, is introduced into the central chamber of the apparatus and the agitator is set into operation, a reciprocating or rocking motion being preferably imparted thereto through the crank 24. Steam is then introduced into the appropriate coil or tubing, the milk being pasteurized at the desired temperature and may be held at this temperature for the desired period. As soon as this operation has been completed, the steam is cut off from the apparatus, and the cooling medium is introduced therein, the liquid contained in the central chamber being cooled to a temperature of about 98° F. The pure culture of souring organisms is now introduced through the small openings in the cover of the apparatus and the liquid in the central chamber is preferably maintained at a temperature of approximately 98° for a period sufficiently to develop the desired amount of lactic acid. When this has been accomplished, the cooling medium is again introduced into the apparatus and the liquid is reduced in temperature to a point as near as possible to the freezing point. During the latter part of the operation, the agitator may be either rocked to and fro or it may be completely revolved through the pulley 25 and by keeping the liquid in a constant state of agitation during the treatment, thickening of the liquid is prevented and it will be found that the product will flow from the apparatus and that it will be uniform in quality.

I claim as my invention:—

1. An apparatus of the class described comprising a chamber having imperforate cylindrical walls and closed at the bottom to contain the substance under treatment, an agitator movable within said chamber, and a tube coiled helically about the exterior of the cylindrical wall of said chamber, said tube being segmental in cross section and presenting an open inner side to the wall of said chamber and having its inner edges permanently secured by a fluid-tight joint to the exterior surface of the wall of said chamber.

2. An apparatus of the class described comprising a cylindrical chamber to contain the substance under treatment, an agitator movable within the chamber and having devices for mixing the substance under treatment, and a length of tubing coiled helically about the exterior of said cylindrical chamber, said tubing being of segmental form in cross section presenting an open inner side to the exterior of the wall of said chamber and having its longitudinal edges bent to form flanges which are rigidly united by a fluid-tight joint to the exterior surface of the cylindrical wall of said chamber, said tubing being adapted for the circulation of a heating or cooling medium.

3. An apparatus of the class described comprising a chamber to contain the liquid under treatment, and duplex conductors associated with said chamber, and means for introducing a heating medium into one of said conductors and a cooling medium into the other conductor.

4. An apparatus of the class described comprising a chamber to contain the substance under treatment, double coils having their convolutions arranged in alternate relation with respect to the wall of said chamber and provided with independent passages, and means for admitting heating and cooling mediums to the respective coils from separate sources.

5. An apparatus of the class described comprising a chamber to contain the substance under treatment, and an agitator rotatably mounted therein and embodying a plate having openings therethrough, and means for causing the liquid to flow in different directions through said openings during rotation of the agitator in a given direction.

6. An apparatus of the class described comprising a chamber and an agitator rotatably mounted therein and embodying a plate provided with openings, and oppositely inclined deflectors arranged adjacent to said openings.

7. An apparatus of the class described comprising a chamber and a rotatable agitator mounted therein and embodying a plate provided with openings, and deflectors for said openings, each deflector being attached to said plate at one edge of its respective opening, the deflectors at one side of said plate being inclined in reverse relation to those at the opposite side thereof.

8. An apparatus of the class described comprising a chamber to contain the substance under treatment, an agitator rotatably mounted in said chamber and having reversely inclined deflectors for producing a mixing action of said substance, and means capable of imparting either a to and fro or a revolving motion to the agitator embodying a rotatable driving element having devices both for revolving it and for partially revolving it alternately in reverse directions.

9. An apparatus of the class described comprising a chamber, and a pair of heating and cooling coils embodying convolutions surrounding said chamber, the convolutions of the heating coil alternating with those of the cooling coil, the tubing of each convolution being segmental in cross section and having its edges secured to the exterior wall of said chamber.

10. An apparatus of the class described comprising a chamber, and a double coil formed into convolutions which surround said chamber, the convolutions of one coil alternating with those of the other coil, and the tubing of each coil being of segmental form in cross section and having its edges formed into flanges arranged in overlapping relation.

In testimony whereof I have hereunto set my hand in presence of two subscribing witnesses.

JOSEPH WILLMANN.

Witnesses:
　CHARLES E. CLARK,
　RALPH H. CLARK.